United States Patent [19]

Fowler

[11] 4,026,805

[45] May 31, 1977

[54] MAGNETIC FILTER

[75] Inventor: Leslie L. Fowler, Tulsa, Okla.

[73] Assignee: Mapco, Inc., Tulsa, Okla.

[22] Filed: Mar. 18, 1976

[21] Appl. No.: 668,082

[52] U.S. Cl. ............................ 210/223; 209/223 R
[51] Int. Cl.² ...................................... B01D 35/06
[58] Field of Search .......... 210/222, 223, 457, 458; 209/212, 213, 223 R, 224, 222

[56] References Cited

UNITED STATES PATENTS

| | | | |
|---|---|---|---|
| 2,149,764 | 3/1939 | Frei .................... | 210/223 |
| 2,184,243 | 12/1939 | Belyarin ................. | 210/223 |
| 2,678,728 | 5/1954 | Spodiv ................... | 209/223 |
| 2,887,230 | 5/1959 | Sicard .................... | 210/222 |
| 3,289,841 | 12/1966 | Aumting ................ | 210/223 X |
| 3,313,416 | 4/1967 | Rosgen ................... | 210/223 X |
| 3,421,627 | 1/1969 | Lammers ................. | 210/223 X |

*Primary Examiner*—Theodore A. Granger
*Attorney, Agent, or Firm*—Head, Johnson & Chafin

[57] ABSTRACT

An apparatus for separating entrained solids and particularly paramagnetic filing entrained in a liquid, including a vessel with a fluid inlet and outlet, a center tube supported within the vessel over the fluid outlet, a plurality of magnetic discs received in spaced orientation on the center tube and a plurality of paramagnetic discs, each paramagnetic disc being positioned between adjacent magnetic discs and a barrier filter tube positioned around the discs, the top and bottom of the tube being closed so that all fluid flowing into the vessel flows radially through the filter tube, the magnetic and paramagnetic discs causing the formation of radially extending flux lines throughout the filter tube so that iron filings collect and orient radially on the exterior of the filter tube.

5 Claims, 3 Drawing Figures

MAGNETIC FILTER

BACKGROUND AND OBJECTS OF THE INVENTION

In industry it is frequently necessary to filter liquid to remove entrained solids. A common problem is that of removing entrained iron particles, iron filings and other paramagnetic contaminants. The use of magnets for this purpose has long been recognized. In addition, the use of barrier type filters has been employed. One problem which has existed with magnetic or barrier filters, or combinations of the two, is that the iron filings soon accumulate on the surface of a barrier filter and form a substantially impervious layer. The filter thereby becomes "clogged," requiring frequent cleaning or replacement of filter elements.

The present invention is directed towards a filter particularly adapted for removing entrained ferromagnetic particles from a fluid, including the use of combination of magnets with a barrier type filter in an arrangement wherein magnetic lines of flux are oriented in such a way as to substantially increase the contaminant collecting ability of the barrier filter before it becomes impervious to the passage of liquid.

It is therefore an object of this invention to provide an improved filter for separating paramagnetic contaminant particles from liquid.

More particularly, an object of this invention is to provide an improved combination magnetic and barrier filter arranged in a way to greatly increase the contaminant collecting capability of the barrier filter.

These general objects as well as other and more specific objects of the invention will be fulfilled in the following description and claims, taken in conjunction with the attached drawings.

DESCRIPTION OF VIEWS

SUMMARY OF THE INVENTION

A combination magnetic and barrier type filter is described for removing entrained solid contaminants from fluid and particularly entrained paramagnetic particles, such as iron filings. The invention includes a vessel having a fluid inlet and outlet, a center tube positioned within the vessel and communicating with the fluid outlet, and a plurality of magnetic discs axially supported on the center tube with a plurality of paramagnetic discs interspersed between the magnetic discs. A barrier type filter tube is positioned over the peripheries of the discs and is closed at the top and bottom so that fluid flowing into the vessel flows radially through the barrier filter and into the center tube. The magnetic and paramagnetic discs are arranged in such a way that lines of flux extend radially through the barrier filter substantially over its entire area so that paramagnetic particles blocked from passage by the barrier filter tend to align themselves radially with the flux lines to thereby substantially increase the contaminant collecting capability of the filter before fluid flow through the filter is impeded.

DETAILED DESCRIPTION

Figure 1:
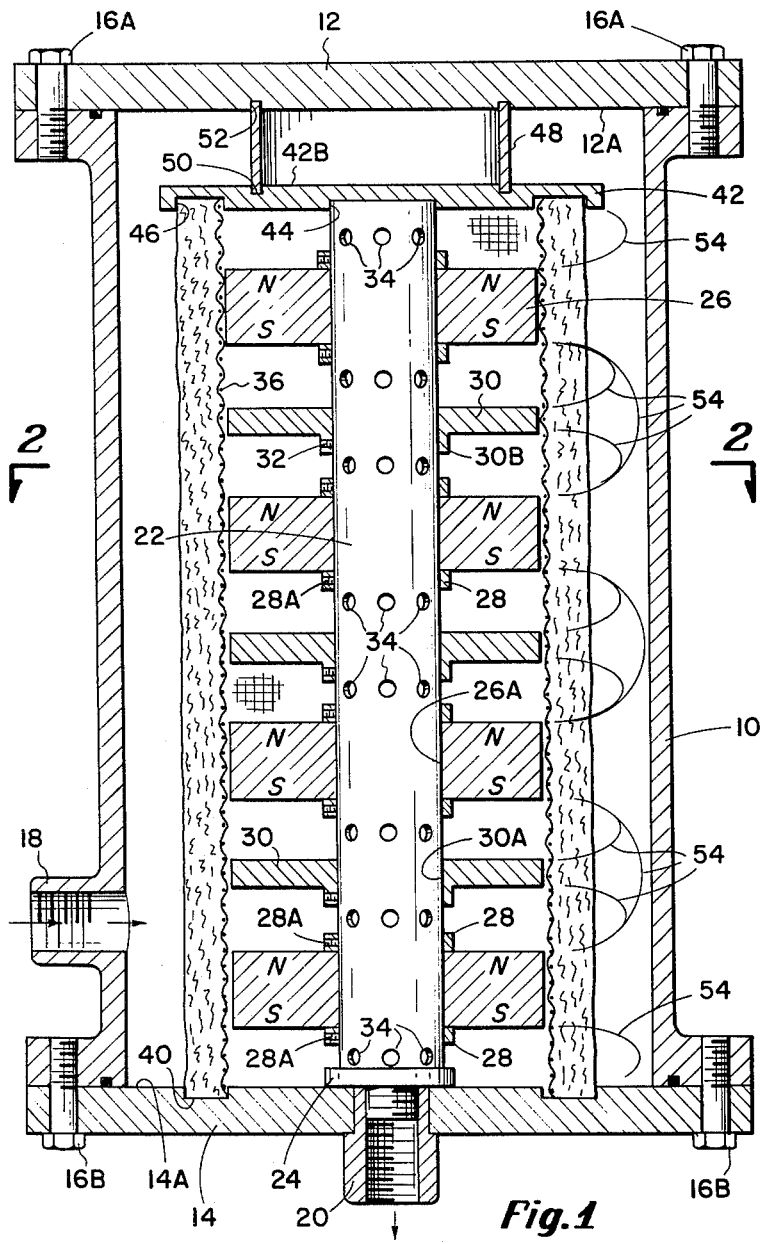
FIG. 1 is a cross-sectional view of a filter employing the principles of this invention.

Referring first to FIG. 1 an embodiment of the invention is illustrated for purposes of exemplification, it being understood that the actual appearance of the device which employs the principle of this invention may vary considerably from that which is illustrated. An upright cylindrical vessel 10 is provided having a top plate 12 and a lower plate 14. The vessel 10 is shown with flanges at both the upper and lower end so that the top plate 12 and lower plate 14 are held in position against the flanges by means of bolts 16A and 16B respectively.

The vessel 10 has a fluid inlet 18 and lower plate 14 has a central fluid outlet 20.

Supported coaxially within vessel 10 is a center tube 22. While the tube may be supported in a variety of ways, the illustrated arrangement includes a collar 24 attached to the upper surface 14A of the lower plate, the collar may be attached such as by welding around the periphery. Collar 24 communicates with the fluid outlet 20.

Received on tube 22 are a plurality of magnetic discs 26, four being shown although the number may be fewer or as great as desired according to the length of the tube 22. Each magnetic disc 26 has an opening 26A therein whereby the discs are received on center tube 22. In order to retain the discs on tube 22 collars 28 are employed, one to either side of each disc. Each collar 28 has a set screw 28A by which it is supported to center tube 22.

Positioned intermediate each adjacent pair of magnetic discs is a paramagnetic disc 30. The paramagnetic discs are of the same diameter as magnetic disc 26 and each has an opening 30A therein and is received on center tube 22. The paramagnetic discs 30 may be supported to tube 22 by separate collars as shown for magnetic disc 26 or, as illustrated, by integral collars 30B, each having a set screw 32 therein.

Center tube 22 has openings or perforations 34 between magnetic discs 26 and paramagnetic discs 30 by which fluid flows into the tube and out through outlet 20.

Positioned around the external periphery of discs 20 and 30 is a wire mesh tube 36 formed of nonparamagnetic material, such as stainless steel, brass or the like. Wire mesh 36 is wrapped or formed about the discs 26 and 30 and forms a support for a filter tube 38 which is received around the peripheral surfaces of the wire mesh tube and thereby completely surrounds the peripheries of discs 26 and 30. Filter tube 38 may be of any barrier type filter material, including woven cotton or any other woven material, or may be formed of a nonwoven mat of natural or synthetic fibers. A preferred arrangement includes the use of a nonwoven mat of polyester fibers. Filter tube 38 may consist of a single layer of barrier filter material or a plurality of layers. The type of material forming the barrier filter 38 will be selected according to the application of the filter device and the degree of filtration required, with a tight woven or closed nap fiber being selected when very fine particles are to be separated from the entrained fluid flowing through the filter.

Formed in the upper surface of lower plate 14 is a circumferential recess 40 which receives the lower end of wire mesh tube 36 and filter tube 38.

Supported at the upper end of center tube 22 is a filter plate 42 having a central recess 44 in the lower surface 44A thereof which receives the upper end of center tube 22. The lower surface also has a larger diameter annular recess 46 which receives the upper end of wire tube 36 and filter tube 38.

The filter plate 42 may be held in position in a variety of ways. One means as illustrated includes the use of a spacer tube 48 which is positioned in an annular recess 50 in the top surface 42B of filter plate 42 and in a corresponding annular recess 52 in the lower surface 12A of the top plate 12.

To disassemble the filter for cleaning or replacement of the barrier filter tube 38, bolts 16A are removed, removing the upper plate 12. Spacer tube 48 may be then removed as well as top filter plate 42. The filter tube 38 may then be slid axially out the upper end of vessel 10 and replaced. If it is necessary to clean the center tube and discs 26 and 30 they may be also removed by lifting the center tube out of collar 24. Thus the entire filter assembly can be disassembled by removing the top bolts 16A.

Figure 3:
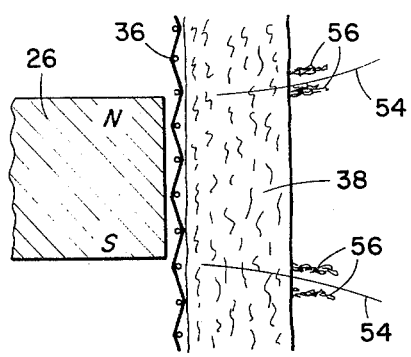
FIG. 3 is an enlarged fragmentary view of a portion of the barrier filter showing the orientation of iron filings trapped by the filter, the orientation being achieved by the radial orientation of lines of magnetic flux.
Figure 2:
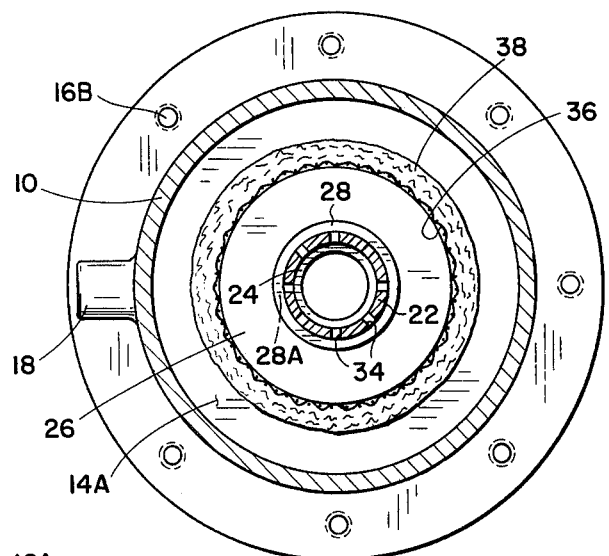
FIG. 2 is a cross-sectional view taken along the line 2—2 of FIG. 1.

The magnetic discs 26 are preferably placed in reverse magnetic orientation as shown in the drawings. By use of the inner dispersed paramagnetic disc 30 lines of magnetic flux, indicated by numeral 54 in FIGS. 1 and 3, extend substantially radially around the entire cylindrical surface of the filter tube 38 and for substantially the entire length. Slightly more flux density will exist adjacent the upper and lower ends of the magnetic disc 26 but the arrangement herein provides good distribution of flux such that flux paths extend essentially radially throughout the entire surface of filter tube 38. As fluid flows into the vessel 10 through inlet 18 it fills the vessel and permeates radially inwardly through the barrier filter 38 and into perforation 34 in center tube 22 to be discharged through outlet 20. Thus the fluid tends to flow radially inwardly through the filter tube 88 and in paths parallel the paths of magnetic flux through the filter tube. Paramagnetic particles which are intercepted by the barrier filter 38 accumulate on the exterior surface. By the arrangement of the magnetic discs 26 with the inner dispersed paramagnetic discs 30 the flux paths tend to orient the paramagnetic filings 56 as shown in FIG. 3 so that the filings tend to accumulate end to end in radially extending arrays. Since each iron filing causes a concentration of magnetic flux, it tends to cause other iron filings to adhere to it and the filings tend to arrange themselves in radially extending order.

This phenomena is extremely important in that it increases the capacity of the barrier filter of this invention to intercept paramagnetic filings.

As shown in FIG. 3, the filings tend to accumulate in radially stacked orientation. Flow paths remain between the radially extending filings permitting fluid to flow through the barrier filter 38 as other filings are intercepted and accumulated on the filter surface.

The useful life of any barrier type filter is determined by the amount of entrapped solids which may be accumulated before the filter closes against adequate fluid flow. By the use of magnetic discs 26 with the interspersed paramagnetic discs 30 arranged such as to provide substantially radially extending lines of magnetic flux, the magnetic filings are caused to stack and accumulate in a way such that a substantially greater quantity of magnetic filings may be intercepted and accumulated while maintaining low resistance to fluid flow. Ultimately the paramagnetic filings will accumulate such that the flow will be blocked and require that the filter element be removed and cleaned or replaced. However, because of the arrangement of the magnetic discs 36 and paramagnetic discs 30 the amount of paramagnetic material which can be intercepted and extracted from the fluid flowing through the filter is greatly increased.

One embodiment of a filter employing the principles of this invention is illustrated. It can be seen that the shape of vessel 10 can be changed innumerable ways as well as the means of supporting center tube 22 and the means of removing and replacing the filter 38 may be employed, all within the principles of this invention.

While the invention has been described with a degree of particularity it is manifest that many changes may be made within the scope of the invention. It is understood that the invention is not limited to the embodiment set forth herein for purposes of exemplification, but is to be limited only by the scope of the attached claim or claims, including the full range of equivalency to which each element thereof is entitled.

What is claimed:

1. An apparatus for separating entrained solids and particularly paramagnetic filings, from liquid, comprising:

a vessel having a fluid inlet and a fluid outlet;

a center tube within the vessel communicating with said fluid outlet;

a plurality of magnetic discs, each having a central axial opening, the discs being received and supported in spaced relationship by said center tube;

a plurality of paramagnetic discs of diameter equal said magnetic discs, each paramagnetic disc having an axial opening therein and being received and supported by said center tube, one paramagnetic disc being positioned intermediate each adjacent pair of magnetic discs, the magnetic and paramagnetic discs being spaced apart of each other, said center tube having perforations therein intermediate said magnetic and paramagnetic discs for the flow of fluid therebetween into the perforations in said center tube;

a filter tube of barrier filter media coaxial with said center tube and discs and encompassing said discs, the interior diameter of said filter tube being slightly greater than the diameter of said magnetic and paramagnetic discs; and means of closing the top and bottom of said filter tube so that fluid flows only radially through said filter tube and into said center tube for discharge from said vessel, the magnetic lines of force between said magnetic discs and paramagnetic discs extending essentially radially through said filter tube whereby paramagnetic filings are trapped on the exterior surface of said filter tube and maintained in substantially radial orientation.

2. An apparatus for separating entrained solids according to claim 1 wherein said filter tube is formed of a polyester fiber mat.

3. An apparatus for supporting entrained solids according to claim 1 including:

a tube of wire mesh positioned about the periphery of said discs, said filter tube being received by the wire mesh tube.

4. An apparatus for separating entrained solids according to claim 3 wherein said wire mesh is of nonparamagnetic metal.

5. An apparatus for separating entrained solids according to claim 1 wherein said means of closing the top of said filter tube comprises:

an upper plate of diameter larger than the diameter of said filter tube, the plate being attached coaxially to the upper end of said center tube, the plate having an annular recess in the lower surface thereof, the inner and outer diameters of said recess being substantially equal the inner and outer diameter of said filter tube, the upper end of said filter tube being received in the plate recess; and a lower plate of diameter larger than the diameter of said filter type and having an axial fluid outlet opening therein communicating with said vessel fluid outlet, the lower end of said center tube being supported coaxially by the lower plate and the lower plate having an annular recess in the upper surface thereof, the inner and outer diameters of the recess conforming to said filter tube, the lower end of which is received therein.

* * * * *